United States Patent
Birkett et al.

(10) Patent No.: US 9,371,473 B2
(45) Date of Patent: Jun. 21, 2016

(54) ACCELERATORS FOR TWO STEP ADHESIVE SYSTEMS

(71) Applicants: Henkel Corporation, Rocky Hill, CT (US); Henkel Ireland Limited, Monheim (DE)

(72) Inventors: David P. Birkett, Kildare (IE); Anthony F. Jacobine, Meriden, CT (US); Andrew D. Messana, Newington, CT (US); Joel D. Schall, Hamden, CT (US); David Mullen, Navan (IE); Martin Wyer, Ontario (CA); Lynnette Hurlburt, Manchester, CT (US); Jiangbo Ouyang, Flemington, NJ (US); Smita Shah, Edison, NJ (US)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 1 day.

(21) Appl. No.: 13/785,007

(22) Filed: Mar. 5, 2013

(65) Prior Publication Data

US 2014/0000807 A1    Jan. 2, 2014

Related U.S. Application Data

(60) Provisional application No. 61/664,799, filed on Jun. 27, 2012.

(51) Int. Cl.
| | |
|---|---|
| *C09J 11/06* | (2006.01) |
| *C09J 4/00* | (2006.01) |
| *B32B 7/12* | (2006.01) |
| *C09J 133/08* | (2006.01) |
| *C08K 5/39* | (2006.01) |
| *C08K 5/405* | (2006.01) |

(52) U.S. Cl.
CPC .. *C09J 11/06* (2013.01); *C09J 4/00* (2013.01); *C09J 133/08* (2013.01); *C08K 5/39* (2013.01); *C08K 5/405* (2013.01)

(58) Field of Classification Search
CPC ............ C09J 11/06; C09J 4/00; C09J 135/02; C09J 135/04; C09J 179/00; B32B 7/12
See application file for complete search history.

(56) References Cited

U.S. PATENT DOCUMENTS

| | | |
|---|---|---|
| 3,218,305 A | 11/1965 | Krieble |
| 3,991,008 A | 11/1976 | Temin et al. |
| 4,039,705 A | 8/1977 | Douek et al. |
| 4,180,640 A | 12/1979 | Melody et al. |
| 4,287,330 A | 9/1981 | Rich |
| 4,321,349 A | 3/1982 | Rich |
| 4,554,301 A | 11/1985 | Dohi et al. |
| 4,569,976 A | 2/1986 | Zimmerman et al. |
| 5,605,999 A | 2/1997 | Chu et al. |
| 6,043,327 A | 3/2000 | Attarwala et al. |
| 7,537,839 B1* | 5/2009 | Attarwala et al. ............ 428/463 |
| 8,598,279 B2 | 12/2013 | Messana et al. |
| 8,609,881 B2 | 12/2013 | Messana et al. |
| 9,243,083 B2 | 1/2016 | Woods et al. |
| 2006/0189728 A1 | 8/2006 | Qian |
| 2007/0040151 A1 | 2/2007 | Utterodt et al. |
| 2010/0249266 A1 | 9/2010 | Yarimizu et al. |
| 2012/0059083 A1* | 3/2012 | Tokui et al. .................. 523/118 |

FOREIGN PATENT DOCUMENTS

| | | |
|---|---|---|
| CA | 2792861 | 9/2011 |
| CN | 101827870 | 9/2010 |
| CN | 102015882 | 4/2011 |
| CN | 102119149 | 7/2011 |
| WO | 2011119546 | 9/2011 |
| WO | 2011159137 | 12/2011 |

OTHER PUBLICATIONS

Rich, "Anaerobic Adhesives", Handbook of Adhesive Technology, 29, 467-79, A. Pizzi and K.L. Mittal, eds., Marcel Dekker, Inc., New York (1994), pp.

* cited by examiner

*Primary Examiner* — Robert Harlan
(74) *Attorney, Agent, or Firm* — Steven C. Bauman

(57) ABSTRACT

Benzoylthiourea or benzoylthiourethane derivatives as cure accelerators in primers for two step adhesive systems are provided.

17 Claims, 5 Drawing Sheets

ACCELERATORS FOR TWO STEP ADHESIVE SYSTEMS

BACKGROUND

1. Field

Benzoylthiourea or benzoylthiourethane derivatives as cure accelerators in primers for two step adhesive systems are provided.

2. Brief Description of Related Technology

Curable adhesive and sealant compositions oftentimes rely on curatives to make them commercially attractive options for end users. Curable adhesive and sealant compositions come in one part formats, two part formats and two step formats depending on the performance profile they are designed to meet and the constituents used to prepare the compositions. Anaerobic adhesives are prominent one part compositions and generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Anaerobic cure-inducing compositions ordinarily used in commercial anaerobic adhesive and sealant compositions to induce and accelerate cure ordinarily include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

GC Corporation submitted to the U.S. Patent and Trademark Office a patent application, which published as U.S. Patent Application Publication No. 2010/0249266, and is directed to a polymerizable composition comprising a first paste and a second paste, where the first paste comprises a polymer of α,β unsaturated monocarboxylic acid or α,β unsaturated dicarboxylic acid, water, and a hydroperoxide as a peroxide, and where the second paste comprises a (meth) acrylate compound not having an acid group, fluoroaluminosilicate glass powder, a thiourea derivative as a reducing material, and a vanadium compound as a polymerization accelerator.

Notwithstanding the state of the technology, there is an on-going desire to find alternative technologies for accelerating the cure of curable compositions to differentiate existing products and provide supply assurances in the event of shortages or cessation of supply of raw materials. Accordingly, it would be desirable to identify new materials, which function as accelerators for curable compositions.

SUMMARY

Benzoylthiourea or benzoylthiourethane derivatives for use as accelerators in primers for two step adhesive systems are provided.

For instance, the benzoylthiourea or benzoylthiourethane derivatives may be within general structure I

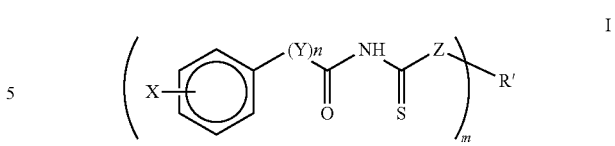

where Z is O or N—R, where R is selected from hydrogen, alkyl, alkenyl, hydroxyalkyl, hydroxyalkenyl, carbonyl, alkylene (meth)acrylate, carboxyl, or sulfonato, or R' is a direct bond attaching to the phenyl ring; R' is selected from hydrogen, alkyl, alkenyl, cycloalkyl, aryl, hydroxyalkyl, hydroxyalkenyl, alkylene- or alkenylene-ether, carbonyl, alkylene (meth)acrylate, carboxyl, nitroso or sulfonato; X is halogen, alkyl, alkenyl, hydroxyalkyl, hydroxyalkenyl, alkoxy, amino, carboxyl, nitroso, sulfonate, hydroxyl or haloalkyl; and Y is —SO₂NH—, —CONH—, —NH—, and —PO(NHCONHCSNH₂)NH—; and n is 0 or 1 and m is 1 or 2.

A more specific general structure is shown below:

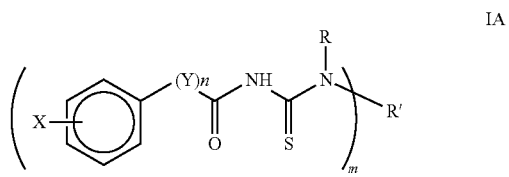

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO₂NH—, —CONH—, —NH—, and —PO(NHCONHCSNH₂)NH—; and n is 0 or 1 and m is 1 or 2.

More specifically, the benzoylthiourea or benzoylthiourethane derivatives may be within structures II or IIA, respectively

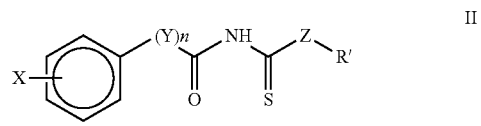

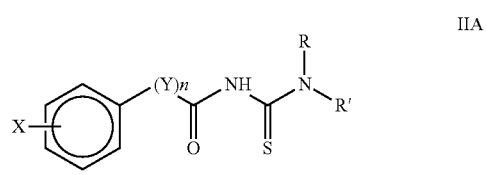

where R, R', Z, X, Y, and n are as defined above.

More specific examples of the benzoylthiourea or benzoylthiourethane derivatives within structures II and IIA, respectively, are set forth below

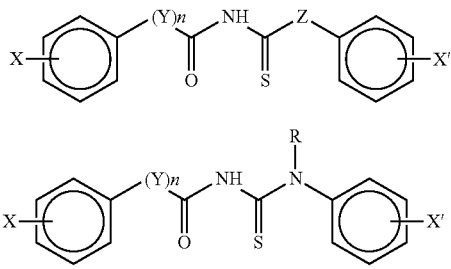

where R, X, Y, Z, and n are as defined above, and X' is defined as X.

Alternatively, the benzoylthiourea or benzoylthiourethane derivatives within structure I may be a bis version, where R' is a linker. That is,

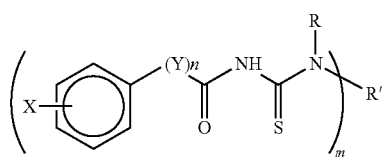

where R, R', X, Y, and n are as defined above, and m is 2.

The benzoylthiourea or benzoylthiourethane derivatives act to accelerate cure of curable compositions and provide adhesive systems with good cure through volume. The present invention will be more fully appreciated by a reading of the "Detailed Description", and the illustrative examples which follow thereafter.

DETAILED DESCRIPTION

Figure 1:
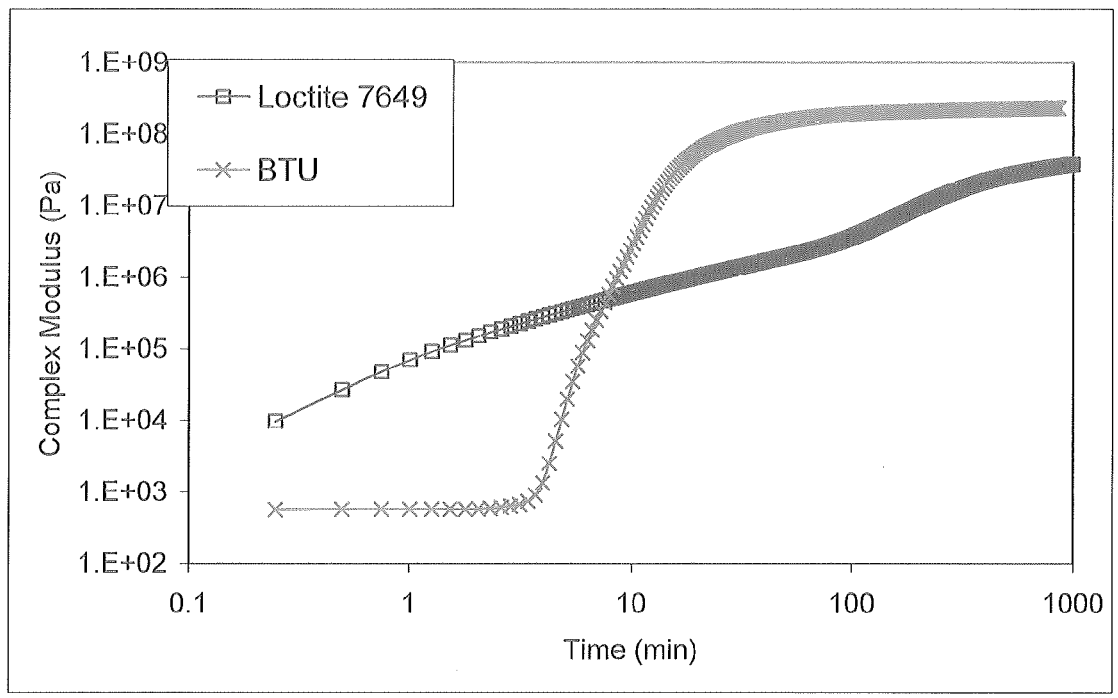
FIG. 1 depicts a rheometry plot of complex shear modulus versus time in a two step adhesive system comparing benzoylthiourea as a primer with LOCTITE 7649.

Here, a primer uses cure accelerators within structure I

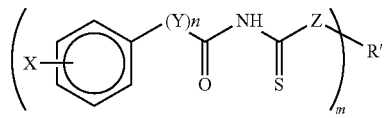

where Z is O or N—R, where R is selected from hydrogen, alkyl, alkenyl, aryl, hydroxyalkyl, hydroxyalkenyl, alkylene (meth)acrylate, carbonyl, carboxyl, or sulfonato, and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

As noted above, a more specific general structure is shown below:

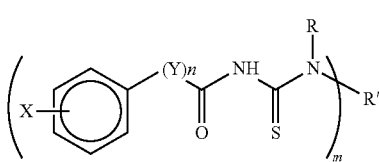

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2.

More specifically, the inventive cure accelerators may be within structures II and IIA respectively

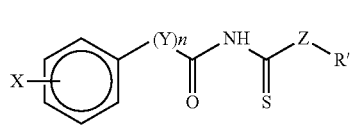

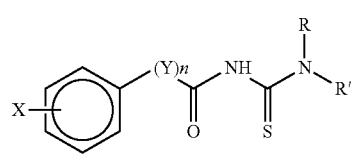

where R, R', X, Y, and n are as defined above.

More specific example of the inventive cure accelerators within structures II and IIA are set forth below

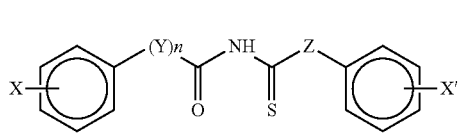

-continued

IIIA where R, X, Y, and n are as defined above, and X' is defined as X.

And even more specifically, the inventive cure accelerators include

Benzoyl morpholinethiourea (BMTU)

Benzoyl octylthiourea (BOTU)

Benzoyl thiodiethylurea (BTDEU)

Benzoyl thiodihydroxyethylurea (BTDHEU)

Benzoyl tetrahydroquinoline thiourea (BTHQTU)

Benzoyl cyclohexylthiourea (BCHTU)

-continued

Cyclohexyl bis-Benzoylthiourea (CH bis-BTU)

Benzoyl napthosultam thiourea (BNSTU)

Benzoyl phenylhydrazide thiourea (BPHTU)

Benzoyl thiourea propyl trimethoxysilane (BTU-PTS)

BTU-H Adduct

BTU-HEMA Adduct

BTU-Water Adduct

BTU-CH Adduct

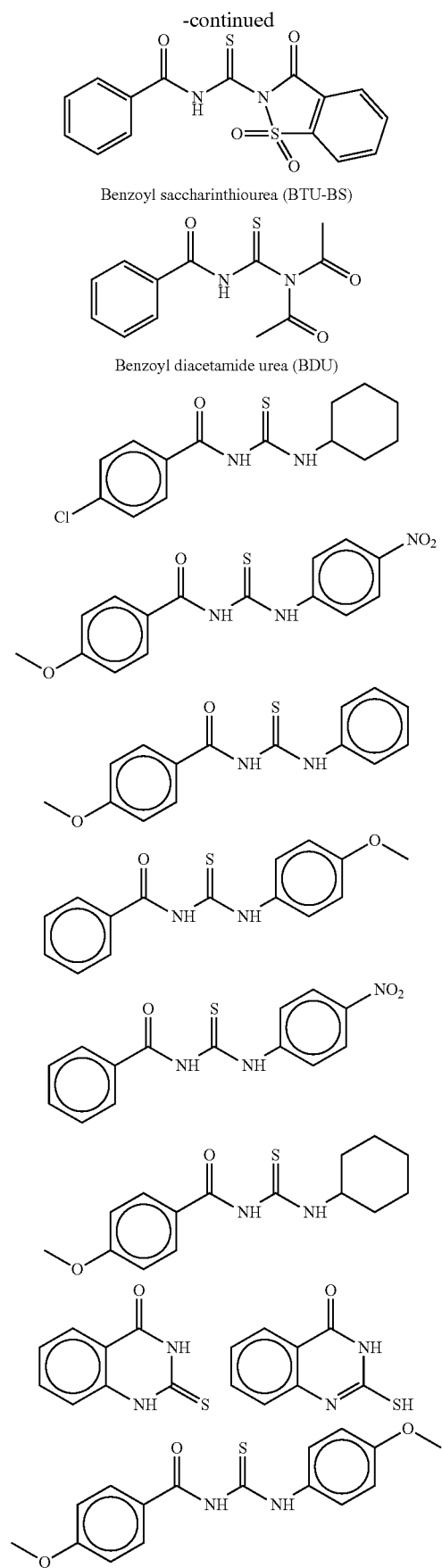

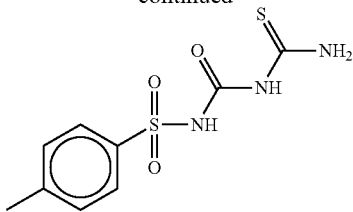

These benzoylthiourea or benzoylthiourethane derivatives may be used as an accelerator in a primer (in a solution, suspension or dispersion, together with an appropriate delivery vehicle or carrier) in two step adhesive systems, where the benzoylthiourea or benzoylthiourethane derivatives are applied first onto a portion of substrate to be bonded followed by the anaerobically curable composition or applied after the composition has been applied. The benzoylthiourea or benzoylthiourethane derivatives display good solubility, stability and/or activity as cure accelerators in curable compositions and as primers in an appropriate delivery vehicle or carrier.

The invention provides a process for preparing a reaction product from a curable composition, comprising the steps of:
applying a compound within structures I or IA

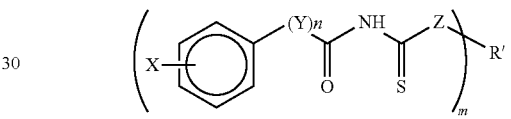

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

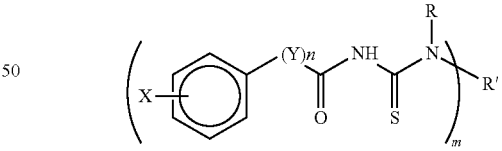

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to a desired substrate surface,
applying a composition comprising a (meth)acrylate component and an oxidant to that desired substrate surface, mating a second surface to that substrate surface to form an assembly, and exposing the assembly to appropriate conditions for a time sufficient to cure the composition.

In yet another aspect, the invention provides a process for preparing a reaction product from a curable composition, comprising the steps of:

applying a composition comprising a (meth)acrylate component and an oxidant to a desired substrate surface, applying a compound within structures I or IA

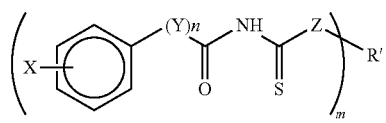
I where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

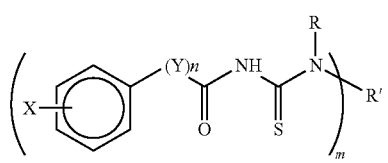
IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to that desired substrate surface, mating a second surface to that substrate surface to form an assembly, and exposing the assembly to appropriate conditions for a time sufficient to cure the composition.

In yet another aspect, the invention provides a process for preparing a reaction product from a curable composition, comprising the steps of:

applying an oxidant to a desired substrate surface, applying a composition comprising a (meth)acrylate component and a compound within structures I or IA

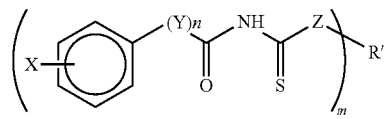
I where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

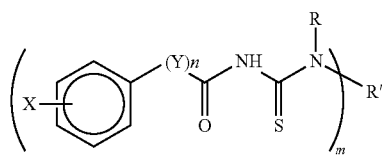
IA where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2 to that desired substrate surface, mating a second surface to that substrate surface to form an assembly, and exposing the assembly to appropriate conditions for a time sufficient to cure the composition.

In yet another aspect, the invention provides a process for preparing a reaction product from a curable composition, comprising the steps of:

applying a composition comprising a (meth)acrylate component and a compound within structures I or IA

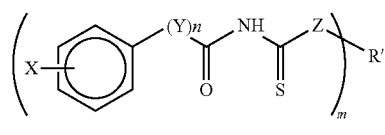
I where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

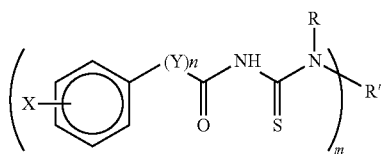

where R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to a desired substrate surface, applying an oxidant to that desired substrate surface, mating a second surface to that substrate surface to form an assembly, and exposing the assembly to appropriate conditions for a time sufficient to cure the composition.

(Meth)acrylate monomers suitable for use as the (meth)acrylate component in the two step adhesive systems may be chosen from a wide variety of materials, such as these represented by H$_2$C=CGCO$_2$R$^1$, where G may be hydrogen or alkyl groups having from 1 to about 4 carbon atoms, and R$^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol)dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight, such as about 60 to about 90 percent by weight, based on the total weight of the adhesive system (exclusive of the carrier vehicle, if the carrier vehicle evaporates prior to assembly and/or cure).

Additional components may be included in traditional curable compositions to alter the physical properties of either the curable compositions or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see U.S. Pat. No. 6,043,327, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The curable compositions may also include other conventional components, such as free radical initiators, other free radical co-accelerators, inhibitors of free radical generation, as well as metal catalysts, such as iron and copper. Depending on the cure environment some or all of these components might ordinarily be used, particularly if cure is to occur under anaerobic conditions.

A number of well-known initiators of free radical polymerization (or, oxidants) are typically incorporated into the curable compositions including, without limitation, hydroperoxides, such as cumene hydroperoxide ("CHP"), para-menthane hydroperoxide, t-amyl hydroperoxide, 1,1,3,3-tetramethylbutyl hydroperoxide and t-butyl hydroperoxide ("TBH"). Other peroxides include t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

It may be desirable in some instances, to provide the oxidant in an encapsulated form.

Such oxidants are typically employed in the range of from about 0.1 to about 10 percent by weight, based on the total weight of the composition, with about 1 to about 5 percent by weight being desirable.

Stabilizers and inhibitors (such as phenols including hydroquinone and quinones) may also be employed to control and prevent premature oxidant decomposition and polymerization of the curable compositions.

In the context of anaerobic curable compositions, chelating agents [such as the tetrasodium salt of ethylenediamine tetraacetic acid ("EDTA")] to trap trace amounts of metal contaminants therefrom, may also be used. When used, chelators may ordinarily be present in the compositions in an amount from about 0.001 percent by weight to about 0.1 percent by weight, based on the total weight of the composition.

The benzoylthiourea or benzoylthiourethane derivatives may be used as cure accelerators in amounts of about 0.1 to about 5 percent by weight, such as about 1 to about 2 percent by weight, based on the total weight of the composition.

Other agents such as thickeners, non-reactive plasticizers, fillers, toughening components (such as elastomers and rubbers), and other well-known additives may be incorporated therein where the art-skilled believes it would be desirable to do so.

The adhesive system may be prepared using conventional methods which are well known to those persons of skill in the art. For instance, the components of the curable composition may be mixed together in any convenient order consistent with the roles and functions the components are to perform in the compositions. Conventional mixing techniques using known apparatus may be employed.

The two step adhesive system may be used to bond a variety of substrates to perform with the desired benefits and advantages described herein. For instance, appropriate substrates may be constructed from steel, brass, copper, aluminum, zinc, glass and other metals and alloys, ceramics and thermosets.

The so-described benzoylthiourea or benzoylthiourethane derivatives may be used in two-step adhesive systems, where exposure to radiation in the electromagnetic spectrum may be used to initiate cure, with cure continuing in those regions of the bond line that are not accessible (or have limited access) to such radiation, such as where opaque substrates are to be bonded. This is known as shadow curing.

Because conventional photocurable adhesive compositions undergo photoinitiated polymerization in those regions of the bond line that have been subjected to radiation in the electromagnetic spectrum but not in other regions, a secondary cure mechanism to affect polymerization in the unirradiated areas, such as may be found in the interior of the bond line, is often used, particularly when opaque substrates are to be bonded as noted above.

One such secondary cure mechanism used in the past relies upon the addition to the compositions of heat-activated peroxides. However, heat-activated peroxides ordinarily use temperatures in excess of 100° C. to initiate polymerization, which is undesirable particularly when heat-sensitive, components are involved. Isocyanates, which are moisture reactive, have been used in the past to provide such a secondary cure. Health and environmental concerns over the use of isocyanates have limited their acceptance. Moisture curable silicones have also been used to impart shadow cure properties to warble compositions. Long cure periods required to build the adhesive strength make them a less appealing approach.

In the context of two-step adhesive systems, here, instead of the conventional approaches, a primer of the so-described benzoylthiourea or benzoylthiourethane derivatives may be used to cure the adhesive composition through the bond line. The primer is applied as a solution, dispersion or emulsion of the benzoylthiourea or benzoylthiourethane derivative in a suitable carrier. Or, where the benzoylthiourea or benzoylthiourethane derivative is itself a liquid, it may be applied neat.

Figure 2:
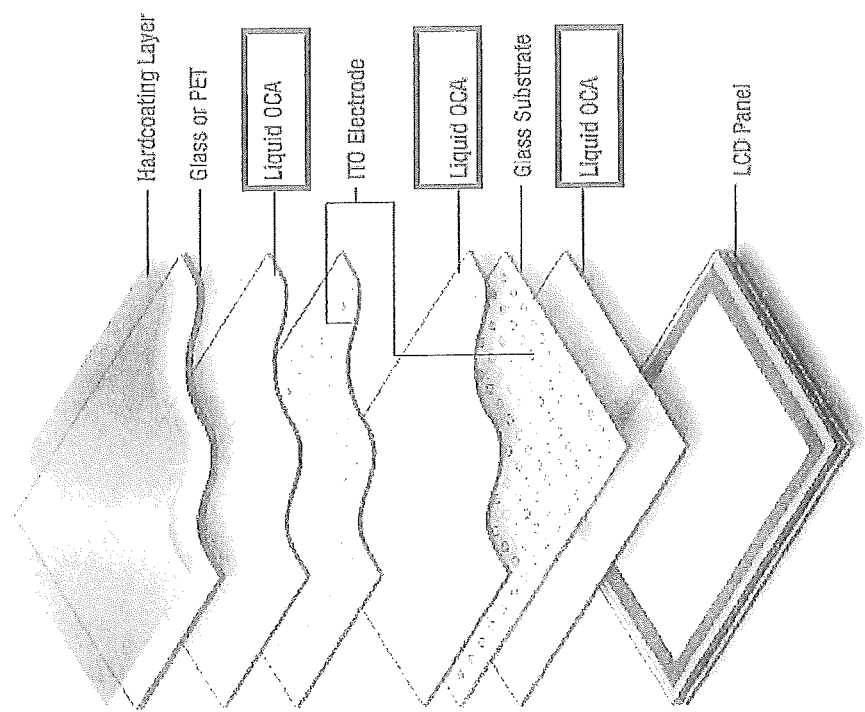
FIG. 2 depicts an exploded perspective view of a cut away of a liquid crystal display device, illustrating three separate application layers of a LOCA between one or more of glass or PET, an ITO electrode, and an LCD panel.

In one such application of the benzoylthiourea or benzoylthiourethane derivative as a primer with a liquid optically clear adhesive ("LOCA") composition, the primer is applied to at least a peripheral portion of the underside of the touch panel of a hand held display device, which when assembled will not have appreciable visibility to a light source used to cure the adhesive with which the accelerator is to be used. Reference to FIG. 2 shows an exploded perspective view of the construction of a liquid crystal display module. Such a module may be used to fabricate television sets, computer monitors, computer tablets and mobile phones, for instance. In the module shown in FIG. 2, three instances of LOCA composition placement may be found: one between a liquid crystal display panel and a glass substrate; one between a glass substrate (the same glass substrate referred to above) and an indium tin oxide-coated electrode; and one between a glass or polyethylene terephthalate substrate and an ITO-coated electrode (the same ITO-coated electrode referred to above).

In view of the above description, it is clear that a wide range of practical opportunities is provided. The following examples are provided for illustrative purposes only, and are not to be construed so as to limit in any way the teaching herein.

EXAMPLES

Many of so-described benzoylthiourea or benzoylthiourethane derivatives were synthesized as set forth below.

A. Syntheses

Benzoyl Isothiocyanate

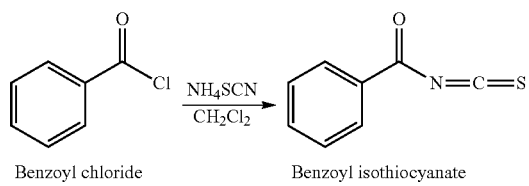

Benzoyl chloride          Benzoyl isothiocyanate

Benzoyl isothiocyanate was prepared as a starting material for benzoyl thiourea and derivates thereof. In a 500 mL three-neck round-bottom flask ("RBF"), fitted with a condenser, thermo-probe, sealed system nitrogen purge, pressure-equilibrated addition funnel and mechanical stirrer, were placed solid ammonium thiocyanate (16.9 g, 0.22 mol) and dichloromethane (100 mL). The stirred mixture was cooled in an ice-water bath to a temperature of about 10-15° C. To the stirred mixture was added a solution of benzoyl chloride (28.4 g, 0.2 mol) in dichloromethane (50 mL) over a period of time of 20 minutes and the reaction mixture was warmed to a temperature near reflux (39° C.) for a period of time of 1 hour. Reaction completion was confirmed by FT-IR analysis. The solution was then cooled to a temperature of about 10-15° C. The solution can be concentrated to an oil to provide the benzoyl isothiocyanate. A boiling point of 128-131° C. at 15 mm Hg was measured.

FT-IR, ATR-Accessory, 3063 cm$^{-1}$ (aromatic C—H), 2000-1921 (—NCS aromatic isothiocyanate), 1685 (carbonyl), 1230 (—C—N—), 846 (aromatic thioisocyanate).

$^1$H—NMR DMSOd$_6$, δ 8.05 (s, multiplet, aromatic H), 7.70 (s, triplet, aromatic H), 7.50 (s, triplet, aromatic H).

$^{13}$C NMR—DMSOd$_6$, δ 161.0 (s, singlet, Ar—CO—), 148.0 (s, singlet, —NCS), 135.0 (m, singlet, aromatic C), 130.0 (s, singlet, aromatic C), 128.0 (s, singlet, aromatic C).

Benzoylthiourea

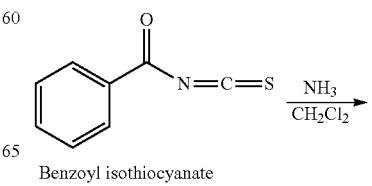

Benzoyl isothiocyanate

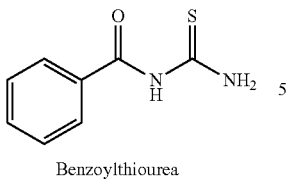

Benzoylthiourea

The RBF was changed to include a sealed glass-fritted bubbler system connected to an ammonia gas supply and an exit bubbler-scrubber system. To the clear cold reaction mixture (controlled at a temperature below 30° C. with an external ice-water bath) was slowly purged ammonia gas. During the addition, ammonia was consumed and the reaction mixture slowly became pale and cloudy/milky in appearance. The mixture was allowed to warm to room temperature, and stirring continued for an additional hour after ammonia addition ceases. Nitrogen gas was then re-introduced into the system to purge residual ammonia gas. The resulting solid is collected by vacuum filtration and washed with additional dichloromethane to provide a slightly yellow solid, which was recrystallized from ethanol. The solid was then dried to a constant weight in vacuo at a temperature of 50° C. and a pressure of <1 mTorr. The resulting solid was observed to have a melting point of 171.62° C., as determined by DSC.

FT-IR, ATR-Accessory, 3301-3146 cm$^{-1}$ (—NH$_2$ and —NH—), 1675 (carbonyl), 1599, 1526 and 1403 (—NCSN—), 1233 (—C—N—).

$^1$H NMR—DMSOd$_6$, δ 11.1 ppm (m, singlet, —NH—), 9.90 and 9.55 doublet, —NH$_2$), 7.90 (s, doublet, aromatic H), 7.60-7.40 (s, multiplet, aromatic H), 3.65 (s, singlet, solvent exchange).

$^{13}$C NMR—DMSOd$_6$, δ 187.5 ppm (NH—CS—NH$_2$), 173.5 (Ar—CO—), 139.0-132.0 (aromatic C).

Benzoyl Thiourea Adducts Made from Amine- or Nitrogen-Containing Compounds

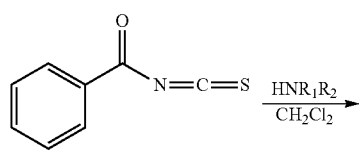

Benzoyl isothiocyanate

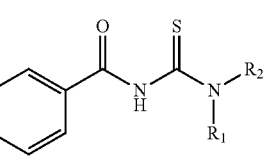

Benzoylthiourea Adduct

Benzoyl Morpholine Thiourea ("BMTU") Adduct

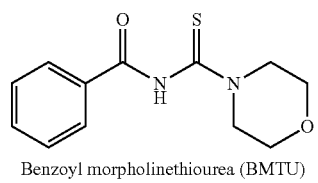 [SMILES: O=C(NC(=S)N1CCOCC1)c1ccccc1]

Benzoyl morpholinethiourea (BMTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point morpholine (13.21 g, 0.150 mol) and dichloromethane (100 mL) were added slowly over a period of time of about 30 minutes. The ice-water bath was removed and the reaction mixture was stirred overnight under a nitrogen purge. The reaction mixture was then concentrated in vacuo at a temperature of 40° C. to provide a crude yellow solid. The solid was recrystallized from refluxing ethyl acetate (50 mL) to provide a yellow solid that was dried to constant weight in vacuo at a temperature of 50° C. and a pressure of <1 mTorr in a 82% yield. The solid was determined to have a melting point of 138° C.

Benzoyl Octyl Thiourea ("BOTU") Adduct

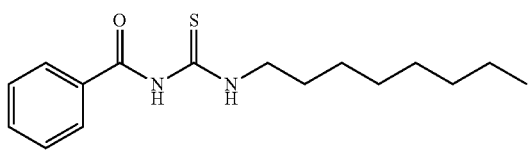

Benzoyl octylthiourea (BOTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath to a temperature of below 5° C., at which point octylamine (19.6 g, 0.150 mol) and dichloromethane (100 mL) was added slowly over a period of time of 30 minutes. The ice-water bath was removed and the reaction mixture was stirred at room temperature under a nitrogen purge overnight. The reaction mixture was washed with water, and the organic layer separated, dried with anhydrous magnesium sulfate, filtered and concentrated in vacuo at a temperature of 40° C. to provide an orange oil. The oil was dried to constant weight in vacuo at a temperature of 50° C. and a presence of <1 mTorr in a 95% yield.

Benzoyl Thiodiethylurea ("BTDEU") Adduct

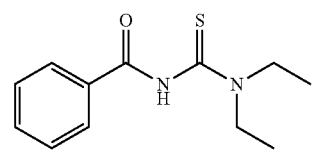

Benzoyl thiodiethylurea (BTDEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diethylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Thiodihydroxyethylurea ("BTDHEU") Adduct

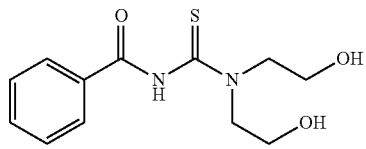

Benzoyl thiodihydroxyethylurea (BTDHEU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point dihydroxyethylamine (15.9 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Tetrahydroquinoline Thiourea ("BTHQTU") Adduct

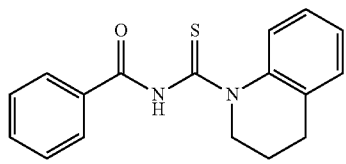

Benzoyl tetrahydroquinoline thiourea (BTHQTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point tetrahydroquinoline (20.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 93% yield. The solid was determined to have a melting point of 143.6° C.

Benzoyl Cyclohexythiourea ("BCHTU") Adduct

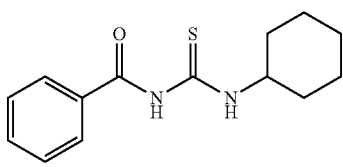

Benzoyl cyclohexylthiourea (BCHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexylamine (15.0 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield. The solid was determined to have a melting point of 67.8° C.

Cyclohexyl Bis-Benzoylthiourea ("CHbisBTU") Adduct

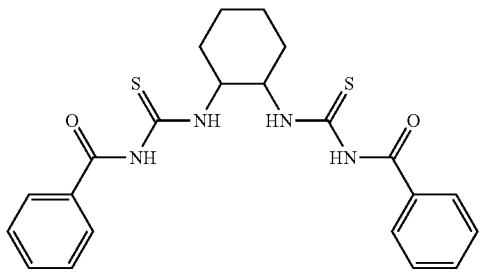

Cyclohexyl bis-Benzoylthiourea (CH bis-BTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point benzoyl isothiocyanate (50.0 g, 0.300 mol) and cyclohexyldiamine (17.42 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide an orange-yellow solid. The solid was dried to constant weight in vacuo at a temperature of 50° C. and a pressure of <1 mTorr in a 99% yield.

Benzoyl Naphthosultamthiourea ("BNSTU") Adduct

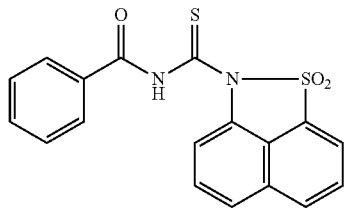

Benzoyl napthosultam thiourea (BNSTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point naphthosultam (31.4 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a brown solid. The brown solid was recrystallized from refluxing ethyl acetate (150 mL) to provide a tan solid that was dried to constant weight in vacuo at a temperature of 50° C. and a pressure of <1 mTorr in a 77% yield. The resulting solid was observed to have a melting point of 264° C.

Benzoyl Phenylhydrazinethiourea ("BPHTU") Adduct

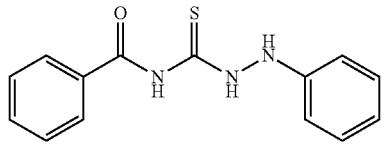

Benzoyl phenylhydrazide thiourea (BPHTU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point phenylhydrazine (16.7 g, 0.150 mol) and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a white solid. The solid was dried to constant weight in vacuo at a temperature of 50° C. and a pressure of <1 mTorr in a 97% yield.

Benzoyl Thiourea Propyltrimethoxysilane ("BTU-TMS") Adduct

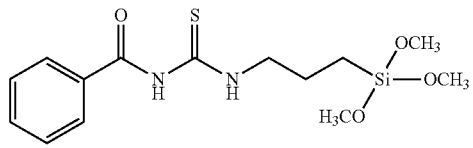

Benzoyl thiourea propyl trimethoxysilane (BTU-PTS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point 3-aminopropyl trimethoxysilane (27.7 g, 0.150 mol) and dichloromethane (100 mL) were added slowly over a period of time of 30 minutes. The ice-water bath was removed and the reaction mixture was stirred at room temperature under a nitrogen purge overnight. The reaction mixture was then concentrated in vacuo at a temperature of 40° C. to provide a clear red liquid. The liquid was dried to constant weight in vacuo at a temperature of 50° C. and a pressure of <1 mTorr in a 97% yield.

Benzoyl Thiourea JEFFAMINE ("BTU-JEFFAMINE") Adduct

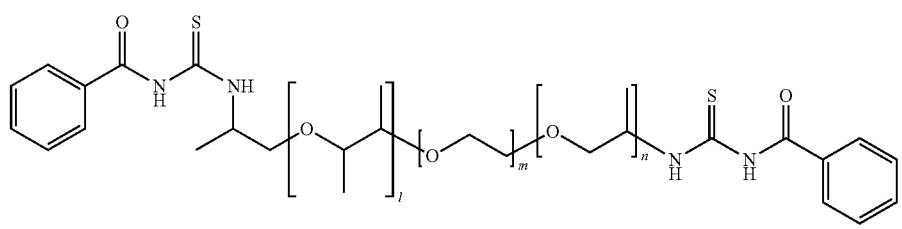

BTU Jeffamine ED-900 Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The reaction mixture was cooled in an ice-water bath to a temperature below 5° C., at which point JEFFAMINE ED-900 (67.5 g, 0.075 mol) and dichloromethane (100 mL) was added slowly over a period of time of 30 minutes. JEFFAMINE ED-900, according to the manufacturer Huntsman Corporation, Woodlands, Tex., is a polyether diamine based on a predominantly PEG backbone, with a molecular weight of 900. In the structure given above, 1 is about 12.5, and m+n is about 6.

The ice-water bath was removed and the reaction mixture was stirred at room temperature under a nitrogen purge overnight. The cloudy solution was then concentrated in vacuo at a temperature of 40° C. to provide a pale amber oil. The liquid was dried to constant weight in vacuo at a temperature of 50° C. and a pressure of <1 mTorr in a 99% yield.

Benzoyl Saccharin Thiourea ("BSTU") Adduct

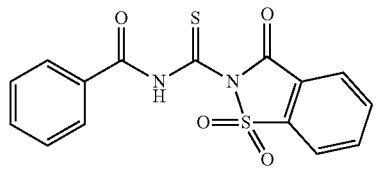

Benzoyl saccharinthiourea (BTU-BS)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) and saccharin (28.1 g, 0.150 mol) followed by dichloromethane (100 mL). The mixture was cooled in an ice-water bath at a temperature below 5° C., at which point water (28.1 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. to provide a solid that was dried to constant weight in vacuo at a temperature of 50° C. and a pressure of <1 mTorr in a 37% yield.

Benzoyl Diacetamide Thiourea ("BDTU") Adduct

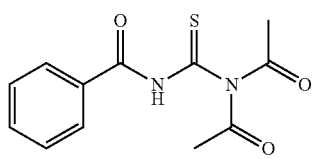

Benzoyl diacetamide urea (BDU)

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point diacetamide (15.3 g, 0.150 mol) and acetone as the solvent and dichloromethane (100 mL) were added slowly over a period of time of about 30 minutes. The ice-water bath was removed and the reaction mixture was stirred under a nitrogen purge overnight. The reaction mixture was then concentrated in vacuo at a temperature of 40° C. and then dried to constant weight in vacuo at a temperature of 50° C. and a pressure of <1 mTorr.

para-Toluene Sulfonyl Thiourea ("PTSTU") Adduct

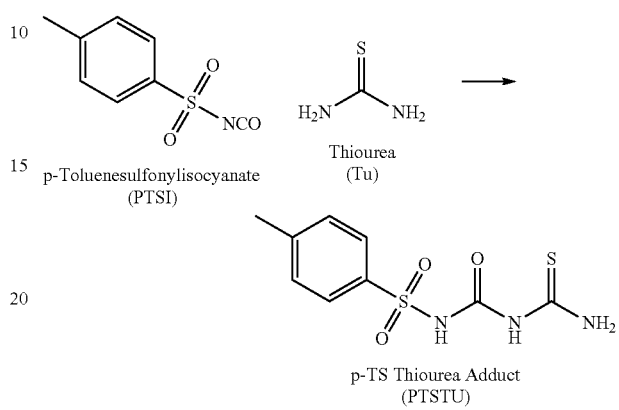

p-Toluenesulfonylisocyanate (PTSI)   Thiourea (Tu)

p-TS Thiourea Adduct (PTSTU)

In a 100 mL RBF equipped with a condenser, thermo-probe, sealed system nitrogen purge, pressure-equilibrated addition funnel and magnetic stirrer were placed thiourea (9.36 g, 0.12 mol) and dioxane (50 mL). The mixture was warmed to a temperature of 100° C. to encourage dissolution. The mixture was then cooled to a temperature of about 20° C., at which point para-toluenesulfonylisocyanate (25.0 g, 0.12 mol) was added slowly over a period of time of 1 hour. A milky-white suspension was observed to form. The temperature was maintained with an ice-water bath between 20° C. and 32° C. The reaction mixture was stirred overnight at room temperature before it was concentrated in vacuo at a temperature of 40° C. to yield a white solid that was further dried to constant weight in vacuo at a temperature of 50° C. and a pressure of <1 mTorr.

Benzoyl Dodecylthiourea ("BDDTU") Adduct

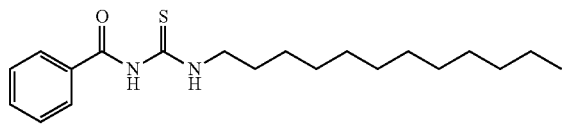 [SMILES: CCCCCCCCCCCCNC(=S)NC(=O)c1ccccc1]

In a 250 mL 3-neck RBF equipped with a condenser, thermo-probe, sealed system nitrogen purge, pressure-equilibrated addition funnel and magnetic stirrer were placed benzoyl isothiocyanate (25.0 g, 0.150 mol) and ethyl acetate (100 mL). The mixture was cooled in an ice-water bath below 5° C., at which point melted dodecylamine (29.3 g, 0.150 mol) (m.p. 30° C.) and ethyl acetate (100 mL) was added slowly over a period of time of 0.5 hours. The ice-water bath was removed and the cloudy solution was stirred at 40° C. under nitrogen purge overnight. The organic phase was separated, washed with water, dried over anhydrous magnesium sulfate, filtered and concentrated in vacuo at a temperature of 40° C. to yield a yellow powdery solid. The solid was dried to constant weight in vacuo at 40° C. and <1 mTorr (99%).

Benzoyl Octadecylthiourea (BODTU) Adduct

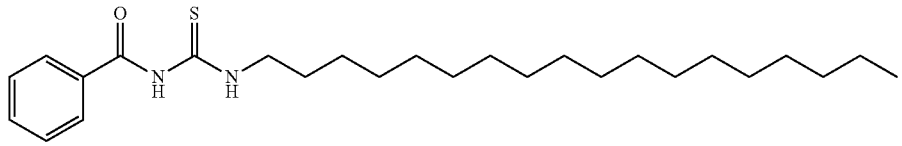 [SMILES: CCCCCCCCCCCCCCCCCCNC(=S)NC(=O)c1ccccc1]

In a 500 mL 3-neck RBF equipped with a condenser, thermo-probe, sealed system nitrogen purge, pressure-equilibrated addition funnel and magnetic stirrer were placed benzoyl isothiocyanate (16.07 g, 96.5 mol) and ethyl acetate (50 mL). The mixture was cooled in an ice-water bath below 5° C., at which point melted octadecylamine (26.5 g, 96.5 mol) (m.p. 55° C.) and ethyl acetate (50 mL) was added slowly over a period of time of 1 hour. The ice-water bath was removed and the cloudy solution was stirred at 50° C. under nitrogen purge overnight. The organic phase was separated, washed with water, dried over anhydrous magnesium sulfate, filtered and concentrated in vacuo at a temperature of 40° C. to yield a pale powdery (waxy) solid. The solid was dried to constant weight in vacuo at 40° C. and <1 mTorr (99%).

Benzoyl Thiourea Adducts Made from Hydroxyl-Containing Compounds

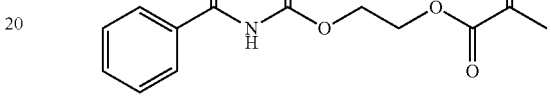

Benzoyl isothiocyanate (1)

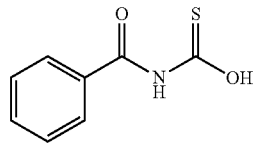

Benzoyl Thiourea Hexanol ("BTU-H") Adduct

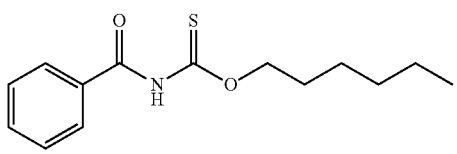

BTU-H Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hexanol (15.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a yellow solid. The solid was dried to constant weight in vacuo at a temperature of 50° C. and a pressure of <1 mTorr in a 83% yield.

Benzoyl Thiourea Hydroxyethyl Methacrylate ("BTU-HEMA") Adduct

BTU-HEMA Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point hydroxyethyl methacrylate (19.5 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a yield of 77%.

Benzoyl Thiourea Water ("BTU-W") Adduct

BTU-Water Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point water (2.7 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. to provide a pale yellow solid. The solid was dried to constant weight in vacuo at a temperature of 50° C. and a pressure of <1 mTorr in a 36% yield.

Benzoyl Thiourea Cyclohexyl ("BTU-CH") Adduct

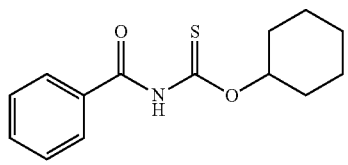

BTU—CH
Adduct

To a 250 mL 3-neck RBF equipped with a condenser, magnetic stirrer, thermo-probe, nitrogen purge and pressure-equilibrated addition funnel was added benzoyl isothiocyanate (25.0 g, 0.150 mol) followed by dichloromethane (100 mL). The mixture was cooled in an ice-water bath at a temperature below 5° C., at which point cyclohexanol (15.2 g, 0.150 mol) and acetone (as the solvent) were added slowly over a period of time of about 30 minutes. The ice-water bath was removed and the reaction mixture was stirred under a nitrogen purge overnight. The reaction mixture was then concentrated in vacuo at a temperature of 40° C. and then was dried to constant weight in vacuo at a temperature of 50° C. and a pressure of <1 mTorr.

B. Use as a Primer in Two Step Adhesive Systems

1. Comparison with LOCTITE 7649

Saccharin (0.5 g) and acetyl phenylhydrazine (0.5 g) were dissolved in 2-hydroxyethyl methacrylate (7.3 g) and acrylic acid (2.45 g) to form a solution, which was added to urethane methacrylate resin (87.99 g). CHP (1 g) was also added to the composition to form the adhesive part of the two step system.

As a primer, BTU (1 g) was dissolved in acetone (99 g).

As a control, LOCTITE 7649 was used. LOCTITE 7649 consists of a copper salt and an aliphatic amine in acetone.

Each primer was applied onto a pair of two aluminum plates in sufficient quantity to cover the inwardly facing surface of the plates; this typically required about 3 drops for a 8 mm diameter plate. Each pair of aluminum plates was then loaded onto a Physica MCR301 rheometer, and the gap between them was zeroed. As a primer-less control, the plates were loaded and the gap zeroed without the application of any primer.

The top plate was withdrawn to a distance of 75 mm, and the adhesive part was loaded onto the bottom plate. The top plate was then lowered to the specified gap.

An oscillatory experiment was performed at a temperature of 25° C. with 1% strain, 30 rad/s angular frequency, 0.55 mm initial gap, and normal force fixed at 0 N. Results are shown in FIG. 1. The BTU primer provided a higher cured modulus and reached ultimate cure in less time than LOCTITE 7649.

2. Comparison with PRIMER T

PRIMER T, commercially available from Henkel Corporation, Rocky Hill, Conn., contains:

| Component | Amt (wt %) |
|---|---|
| Acetone | 85.75 |
| Isopropanol, anhydrous grade | 12.25 |
| 2-Mercaptobenzothiozole | 0.9 |
| N,N-Diethanol-p-toluidine | 1.1 |

The 2-mercaptobenzothiozole in PRIMER T was replaced at an equal weight with each of tetramethyl thiourea and BTU, and evaluated compared with PRIMER T for its performance as a primer in a two step adhesive system with LOCTITE 2701.

The BTU-primed stainless steel substrates showed a fixture time of less than 1 hour across 500 micron gap stainless steel substrates. The fixture time was reduced to about 20 minutes on mated GMBS substrates with the same gap.

| | Stainless Steel | | |
|---|---|---|---|
| | Fixture Time (mins)/Gap | | |
| Primer | 0 | 250 μm | 500 μm |
| None | 11 to 20 | >70 | >145 |
| PRIMER T | 10 to 20 | >80 | Not tested |
| Tetramethyl Thiourea | 15 to 25 | >70 | Not tested |
| BTU | <5 | 10 to 15 | <60 |

| | GBMS | | |
|---|---|---|---|
| | Fixture Time (mins)/Gap | | |
| Primer | 0 | 250 μm | 500 μm |
| None | 15 to 30 | >160 | >180 |
| PRIMER T | 15 to 30 | 20 to 30 | >67 |
| Tetramethyl Thiourea | <15 | 110 to 140 | Not tested |
| BTU | <6 | 10 to 20 | 15 to 30 |

Tensile shear strength after curing for 24 hours also show the BTU to be superior in gap cure in comparison to the other candidates, particularly on stainless steel.

| | Stainless | | |
|---|---|---|---|
| | Shear Strength/Gap | | |
| Primer | 0 | 250 μm | 500 μm |
| None | 9.24 | 2.08 | 0.10 |
| PRIMER T | 5.99 | 1.92 | 0.44 |
| Tetramethyl Thiourea | 8.44 | 4.72 | 1.38 |
| BTU | 5.99 | 5.59 | 6.97 |

| | GBMS | | |
|---|---|---|---|
| | Shear Strength/Gap | | |
| Primer | 0 | 250 μm | 500 μm |
| None | 16.75 | 9.03 | 3.27 |
| PRIMER T | 18.69 | 13.65 | 9.13 |
| Tetramethyl Thiourea | 18.88 | 12.78 | 7.68 |
| BTU | 18.16 | 14.36 | 9.46 |

A similar evaluation, as with LOCTITE 2701, was performed with each of LOCTITE 5188, 326, and 270 on unprimed stainless steel substrates and ones primed with BTU and PRIMER T. The BTU-primed substrates showed a significant improvement in fixture time for 5188 and 326, as may be seen with reference to the tables below.

| BTU | | | |
|---|---|---|---|
| | Fixture Time (mins)/Gap | | |
| Product | 0 | 250 μm | 500 μm |
| 5188 | <5 | <10 | 15-20 |
| 326 | 2-3 | 5-10 | 11-30 |
| 270 | <5 | 5-10 | 12-19 |

| PRIMER T | | | |
|---|---|---|---|
| | Fixture Time (minutes)/Gap | | |
| Product | 0 | 250 μm | 500 μm |
| 5188 | 21-49 | Not Tested* | Not Tested* |
| 326 | 30-60 | | |
| 270 | 35-60 | | |

*0 gap fixture time was too slow to be practical

| No Primer | | | |
|---|---|---|---|
| | Fixture Time (mins)/Gap | | |
| Product | 0 | 250 μm | 500 μm |
| 5188 | >60 | Not Tested | Not Tested |
| 326 | 5-6 | >100 | >100 |
| 270 | 13-30 | >120 | >120 |

LOCTITE 326 showed virtually no loss in strength from 0 to 500 micron gap, whether after one hour room temperature cure or 24 hours room temperature cure.

| | 1 Hour RTC Tensile Shear Strength (N/mm$^2$) | | |
|---|---|---|---|
| Product | 0 Gap | 250 μm | 500 μm |
| 5188 | 7.17 | 6.90 | 2.94 |
| 326 | 11.81 | 13.28 | 10.16 |

| | 24 Hour RTC Tensile Shear Strength (N/mm$^2$) | | |
|---|---|---|---|
| Product | 0 Gap | 250 μm | 500 μm |
| 5188 | 7.69 | 6.87 | 5.35 |
| 326 | 12.76 | 15.29 | 12.11 |

BTU derivatives as primers were also evaluated. Here, compounds A-I were evaluated as primers, as shown and described below.

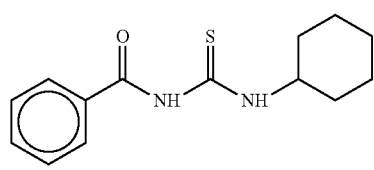

A

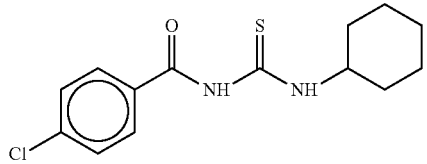

B

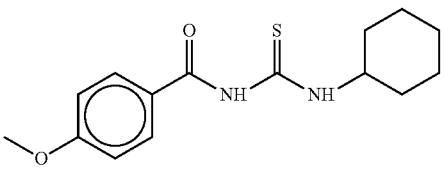

C

Fixture times a Stainless steel substrates are reported below for BTU and compounds A-C:

| | Primer/Fixture Time (mins) | | | |
|---|---|---|---|---|
| Gap | BTU | A | B | C |
| 0 | 5 | 60 | 10 | 5 |
| 250 μm | 6-15 | Fixture after 24 hours | 20 | 10 |
| 500 μm | 11-15 | Some failure of bonds even after 24 hours | 60 | 15 |

Compound C shows useful benefits even over BTU itself at zero gap, but BTU itself performs much better through gap.

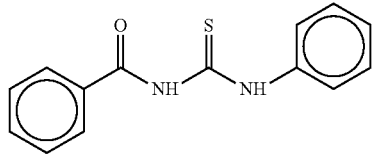

D

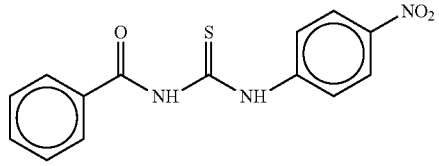

E

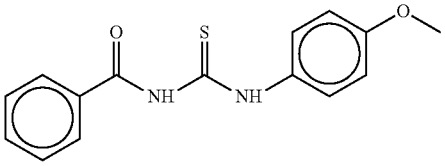

F

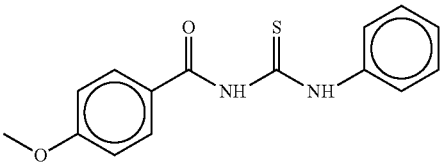

G

Fixture times on stainless steel substrates are reported below in the table for compounds D-G. For compound E no fixture was observed in 60 minutes at a gap of 250 μm or 500 μm.

| | Primer/Fixture time (mins) | | | |
|---|---|---|---|---|
| Gap | D | E | F | G |
| 0 | 10 | 60 | 10 | 10 |
| 250 μm | 20 | No fixture | 25 | 25 |
| 500 μm | </+50 | No fixture | 45 | 45 |

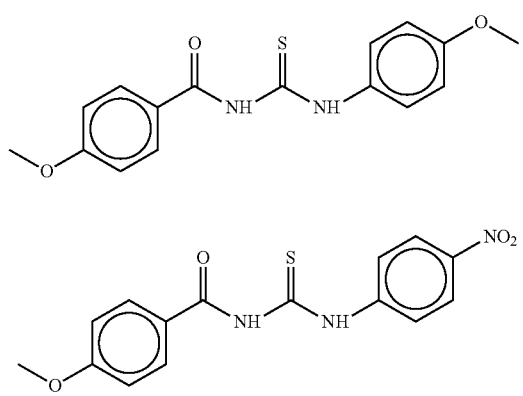

Fixture times on stainless steel substrates are reported below for compounds H and I. For compound I no fixture was observed in 60 minutes at a gap of 250 μm or 500 μm.

| | Primer/Fixture Time (mins) | |
|---|---|---|
| Gap | H | I |
| 0 | 10 | 60 |
| 250 μm | 20 | No fixture |
| 500 μm | 40 | No fixture |

While some BTU derivatives match or even outperform BTU as a primer in two step adhesive systems at zero gap and even at a gap of 250 microns, BTU itself still stands out at a gap of 500 microns.

The two-step adhesive system using the primer approach is particularly attractive with liquid optically clear adhesive ("LOCA") compositions. These LOCA compositions are attractive options for the assembly of liquid crystal display modules. (See FIG. 2.)

C. Use as a Primer with LOCA Composition

Figure 3:
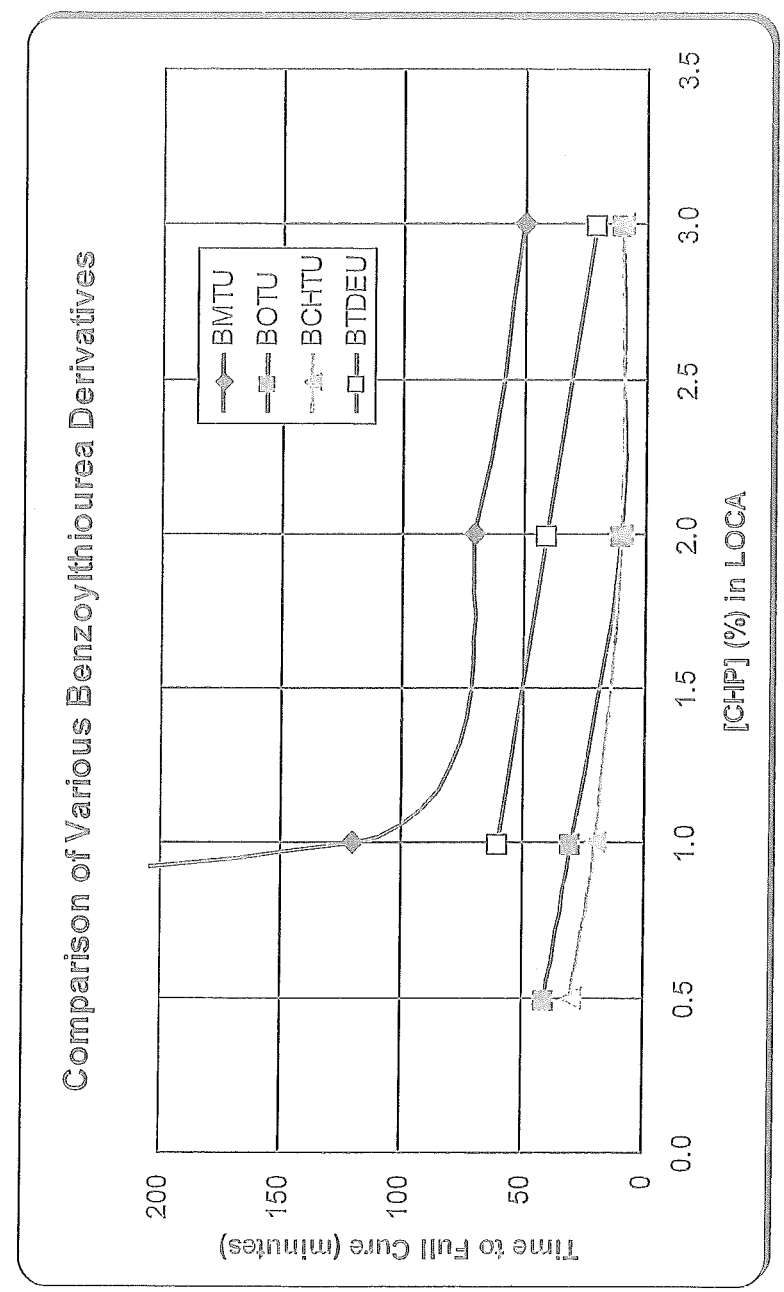
FIG. 3 depicts a plot of CHP concentration (as weight percent in a LOCA) versus cure time (in minutes) for various BTU derivatives as a primer.

LOCA compositions used here are available commercially from Henkel Corporation, Rocky Hill, Conn., under the trade names LOCTITE 3191, 3192, 3193, 3195, and 3196. For instance, LOCTITE 3195 contains polymerizable (meth) acrylated rubber resins with a molecular weight of up to 100,000 and IRGACURE 184 (commercially available from BASF Corporation) as a photoinitiator. A hydroperoxide-based oxidizing agent, here CHP, was added in varying amounts, up to 10% based on the (meth)acrylated rubber resins. The primer here was chosen from one of BTU, BOTU, BCHTU, BTDEU, BMTU, JEFFAMINE BTU, p-TSI TU, and BPHTU and employed as a 5% solution in an acetone/isopropanol solvent mixture. In FIG. 3, the effect of the CHP level on shadow cure profiles is shown for BMTU, BOTU, BCHTU and BTDEU as primers.

A primer of a pre-determined volume was applied onto a glass substrate (dimensions: 1"×4") in an amount of about 0.3 ml and allowed to air dry for about 10-15 minutes. A 2 mil thick layer of the LOCA composition was then applied on another glass slide. The primer coated glass substrate was brought into contact with a second glass substrate previously coated with the LOCA composition. The total contact area where the primer and the LOCA composition layer are in contact is between 1"×2". Each substrate assembly was then allowed to cure for various pre-determined times before being subjected to adhesion evaluation in shear mode with a known weight (100 grams).

Each primer was applied to a glass slide in an amount of about 0.3 ml and allowed to air dry for about 10-15 minutes. A 2 mil thick layer of the LOCA composition was then applied on another glass slide.

| | Primer No./Identity | | | | | | | |
|---|---|---|---|---|---|---|---|---|
| Cure Time (hours) | 2 BTU | 3 BMTU | 4 BPHTU | 5 JEFFAMINE BTU | 6 p-TSI TU | 7 BOTU | 8 BCHTU | 9 BTDEU |
| 0.5 | Not cured | Cured | Not cured | Not cured | Not cured | Cured | Cured | cured |
| 1 | Not cured | — | Not cured | Not cured | Not cured | — | — | — |
| 1.5 | Not cured | — | Not cured | Not cured | Not cured | — | — | — |
| 2 | Not cured | — | Not cured | Not cured | Not cured | — | — | — |
| 18 | Not cured | — | Not cured | Not cured | Not cured | — | — | — |
| 24 | Cured | — | Not cured | Not cured | Not cured | — | — | — |

BOTU was selected to demonstrate the primer efficacy at various usage levels and various cure time periods. The primer usage level was varied by changing the concentration. As above, LOCTITE 3195 with 3% by weight cumene hydroperoxide was used as the LOCA composition at a 2 mil thickness. The shadow cure results with various levels of BOTU primer are shown in the table below. More specifically, Sample Nos. 7-1 through 7-6 used respectively 5.0%, 2.5%, 1.25%, 0.63%, 0.31% and 0.15%.

| Cure Time (mins) | Primer No. 7/Amt (wt %) | | | | | |
|---|---|---|---|---|---|---|
| | 7-1 5.0% | 7-2 2.50% | 7-3 1.25% | 7-4 0.63% | 7-5 0.31% | 7-6 0.15% |
| 10 | Cured | Cured | Cured | Cured | Partially cured | Not cured |
| 20 | — | — | — | — | Cured | Not cured |
| 30 | — | — | — | — | — | Not cured |
| 60 | — | — | — | — | — | Not cured |
| 120 | — | — | — | — | — | Not cured |

BMTU was selected to demonstrate primer effectiveness for shadow cure at various thicknesses of adhesive layer. BMTU was used as a 5% solution in an acetone/isopropanol solvent mixture. The LOCA composition used here was as above. The adhesive thickness was varied from direct contact to 10 mils and the cure time was varied too. The variables and results are shown below in the table.

| Cure Time (mins) | LOCTITE 3195 CHP/Application Thickness (mil) | | | | | |
|---|---|---|---|---|---|---|
| | 3195-1 ~0 | 3195-2 2 | 3195-3 4 | 3195-4 6 | 3195-5 8 | 3195-6 10 |
| 10 | Not cured | Not cured | Not cured | Not cured | Not cured | Not cured |
| 20 | Not cured | Not cured | Not cured | Not cured | Not cured | Not cured |
| 30 | Cured | Not cured | Not cured | Not cured | Not cured | Not cured |
| 40 | — | Not cured | Not cured | Not cured | Not cured | Not cured |
| 50 | — | Cured | Not cured | Not cured | Not cured | Not cured |
| 60 | — | — | Not cured | Not cured | Not cured | Not cured |
| 70 | — | — | Not cured | Not cured | Not cured | Not cured |
| 80 | — | — | Cured | Not cured | Not cured | Not cured |
| 90 | — | — | — | Cured | Not cured | Not cured |
| 100 | — | — | — | — | Cured | Cured |

BMTU was also used to establish a shadow cure profile with various levels of the cumene-hydroperoxide oxidizing agent in the LOCA composition. More specifically, Sample Nos. 3195-7 to 3195-11 had respectively 0%, 0.5%, 1%, 2% and 3% CHP. The base LOCA composition and the primer concentration was used as before. The results are shown below in the table.

| Cure Time (hours) | LOCTITE 3195/CHP | | | | |
|---|---|---|---|---|---|
| | 3195-7 | 3195-8 | 3195-9 | 3195-10 | 3195-11 |
| 1 | Not cured | Not cured | Not cured | Cured | Cured |
| 2 | Not cured | Not cured | Cured | — | — |
| 3 | Not cured | Not cured | — | — | — |
| 24 | Not cured | Cured | — | — | — |

Three BTU derivatives—BMTU, BOTU, and BCHTU—were used as a primer with cumene hydroperoxide-containing LOCA compositions. Each LOCA composition was applied to a glass substrate at a thickness of 2 mil. The table below shows the shadow cure profiles of five noted LOCA compositions with the three noted BTU primers.

| Adhesive Identity/ Cure Time (min) | Primer | | |
|---|---|---|---|
| LOCTITE 3191 | 3191-1 BMTU | 3191-2 BOTU | 3191-3 BCHTU |
| 10 | Not cured | Cured | Cured |
| 20 | Not cured | — | — |
| 30 | Not cured | — | — |
| 40 | Not cured | — | — |
| 50 | Not cured | — | — |
| 60 | Cured | — | — |
| LOCTITE 3192 | 3192-1 BMTU | 3192-2 BOTU | 3193-3 BCHTU |
| 10 | Not cured | Not Cured | Cured |
| 20 | Not cured | Not Cured | — |
| 30 | Not cured | Not Cured | — |
| 40 | Not cured | Cured | — |
| 50 | Not cured | — | — |
| 60 | Not cured | — | — |
| LOCTITE 3193 | 3193-1 BMTU | 3193-2 BOTU | 3193-3 BCHTU |
| 10 | Not cured | Not cured | Cured |
| 20 | Not cured | Cured | — |
| 30 | Not cured | | |
| 40 | Not cured | | |
| 50 | Not cured | | |
| 60 | Not cured | | |
| LOCTITE 3194 | 3194-1 BMTU | 3194-2 BOTU | 3194-3 BCHTU |
| 10 | Not cured | Cured | Cured |
| 20 | Not cured | — | — |
| 30 | Not cured | — | — |
| 40 | Cured | — | — |
| 50 | — | — | — |
| 60 | — | — | — |
| LOCTITE 3195 | 3195-1 BMTU | 3195-2 BOTU | 3195-3 BCHTU |
| 10 | Not cured | Not cured | Cured |
| 20 | Not cured | Not cured | — |
| 30 | Not cured | Not cured | — |
| 40 | Not cured | Cured | — |
| 50 | Not cured | — | — |
| 60 | Cured | — | — |

Figure 4:
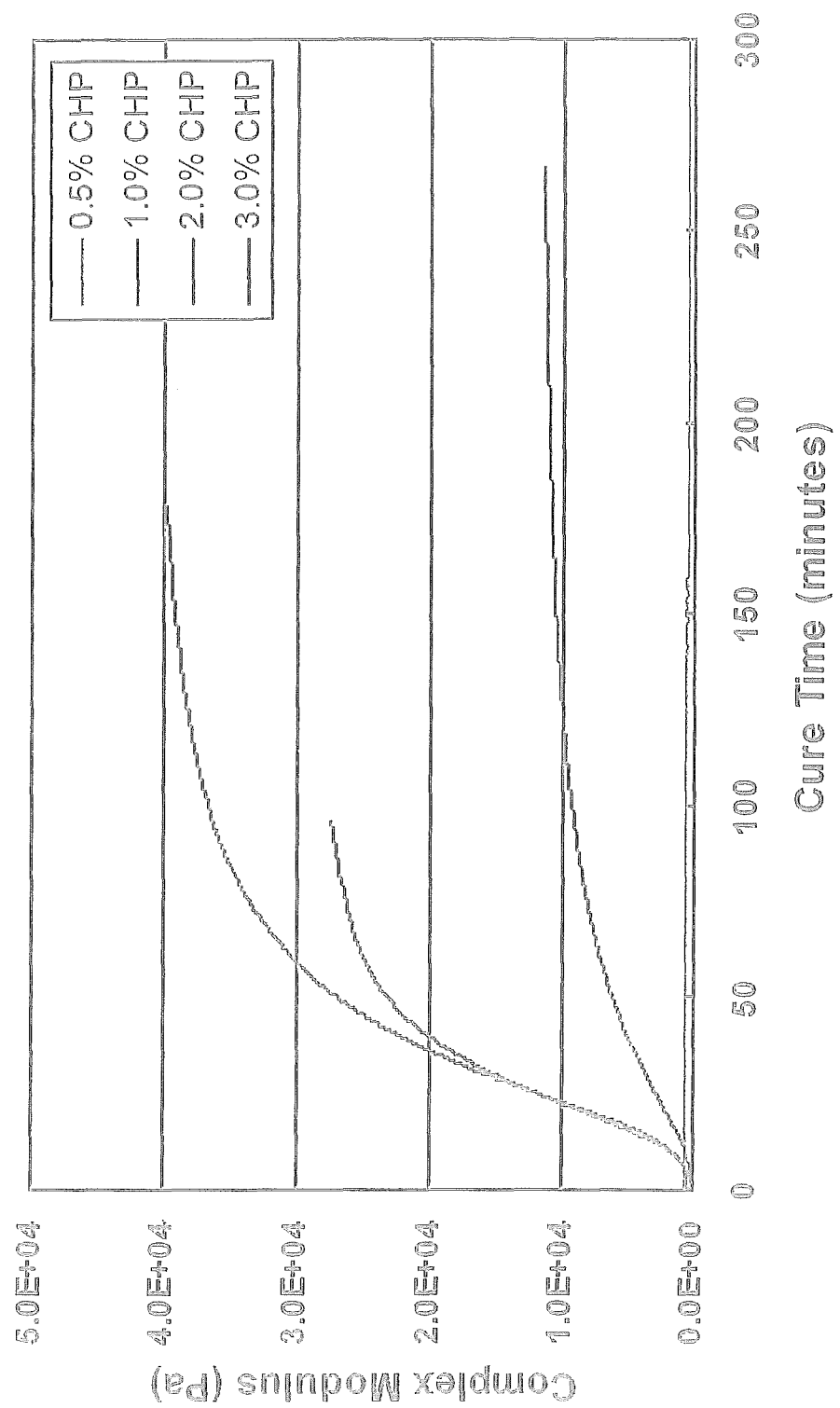
FIG. 4 depicts a plot of cure time (in minutes) versus CHP concentration (as weight percent in a LOCA) for BOTU as a primer.
Figure 5:
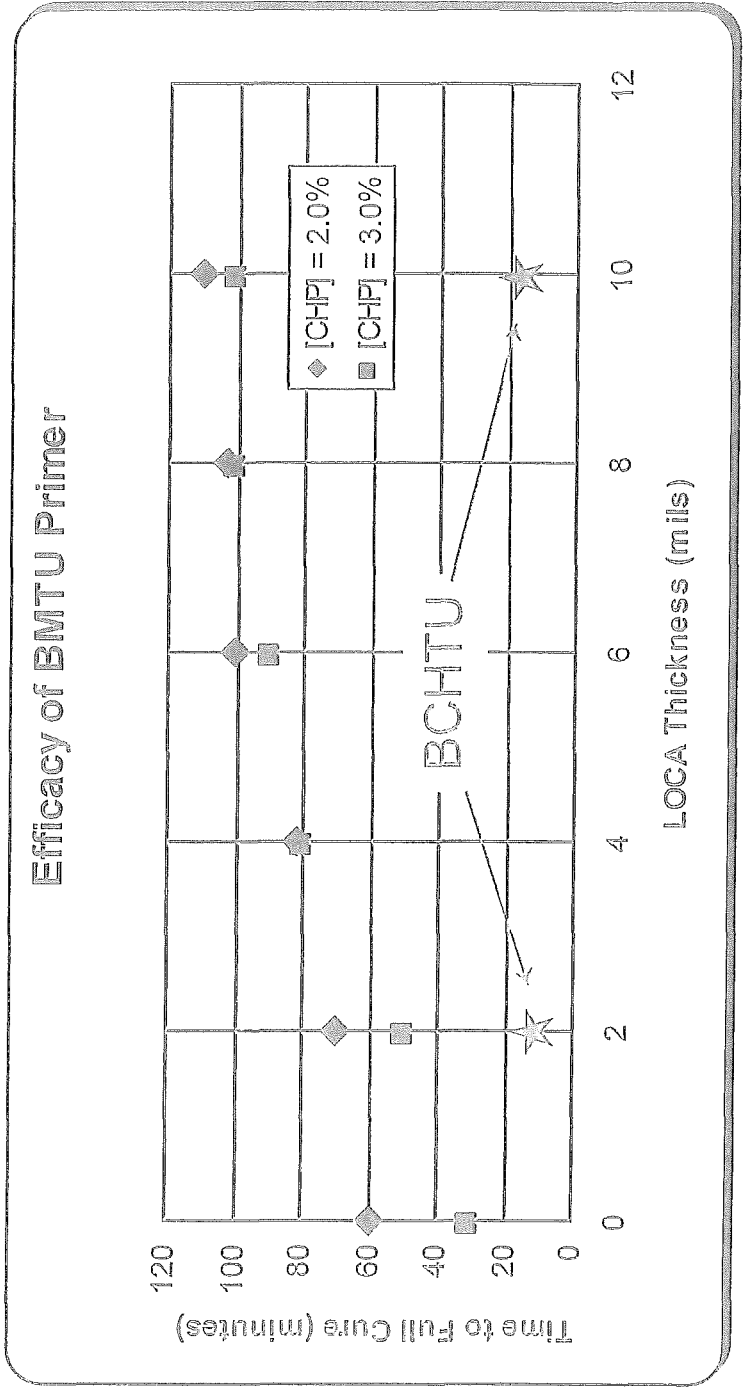
FIG. 5 depicts a plot of LOCA thickness (in mils) versus cure time (in minutes) for each of 2% and 3% CHP additions to the LOCA using BMTU as a primer.

Reference to FIGS. 4 and 5 also shows the benefits of certain benzoylthiourea derivatives as primers together with oxidant-containing LOCA compositions on cure time and cure through volume, respectively.

Here, adhesive compositions based on (meth)acrylated silicones were evaluated in a two-step adhesive system with BTU derivatives as primers. A series of SILMER-branded reactive silicones (available commercially from Siltech), were used to assess the effectiveness of the BTU derivatives as primers for the acrylate functional silicone pre-polymers.

Two materials—BOTU and BCHTU—were used to shadow cure the SILMER-branded silicone pre-polymers. In each example shown in the table below 0.3 ml of a 5% primer solution was employed and each adhesive composition contained 3% by weight of cumene hydroperoxide as an oxidizing agent.

| Primer | SILMER/Fixture Time (mins) | | | | |
|---|---|---|---|---|---|
| | Di-25* | Di-50+ | Di-1010✓ | Di-1508× | Di-2510@ |
| BCHTU | 100 | No cure | 30 | 35 | 55 |
| BOTU | No cure | No cure | 50 | 50 | 50 |

*25 silicone units
+50 silicone units
✓10 silicone units - 10 ethylene oxide ("EO") units
×15 silicone units - 15 EO units
@25 silicone units - 10 EO units

What is claimed is:

1. A process for preparing a reaction product from a curable composition, comprising the steps of:
   applying a benzoyl thiourea or benzoyl thiourethane compound within structure I or IA

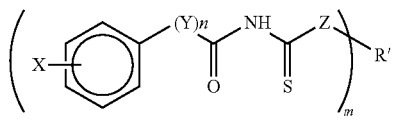

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

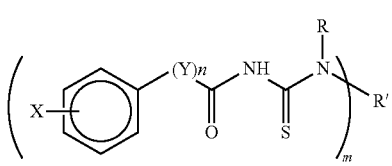

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to a desired substrate surface,
   applying a composition comprising a (meth)acrylate component and an oxidant to that desired substrate surface,
   mating a second surface to that substrate surface to form an assembly, and
   exposing the assembly to appropriate conditions for a time sufficient to cure the composition.

2. A process for preparing a reaction product from a curable composition, comprising the steps of:
   applying a composition comprising a (meth)acrylate component and an oxidant to a desired substrate surface,
   applying a benzoyl thiourea or benzoyl thiourethane compound within structure I or IA

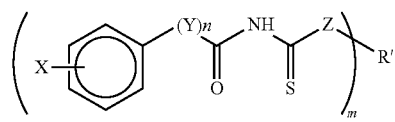

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

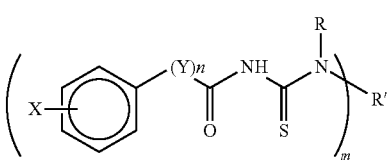

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to that desired substrate surface,
   mating a second surface to that substrate surface to form an assembly, and
   exposing the assembly to appropriate conditions for a time sufficient to cure the composition.

3. A process for preparing a reaction product from a curable composition, comprising the steps of:
   applying an oxidant to a desired substrate surface,
   applying a composition comprising a (meth)acrylate component and a benzoyl thiourea or benzoyl thiourethane compound within structure I or IA

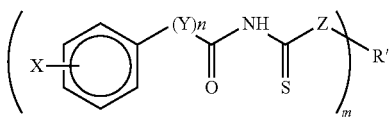

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth) acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

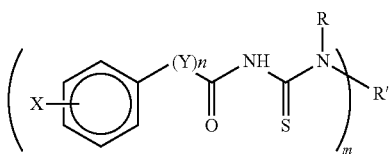

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth) acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2 to that desired substrate surface,
    mating a second surface to that substrate surface to form an assembly, and
    exposing the assembly to appropriate conditions for a time sufficient to cure the composition.

4. A process for preparing a reaction product from a curable composition, comprising the steps of:
    applying a composition comprising a (meth)acrylate component and a benzoyl thiourea or benzoyl thiourethane compound within structure I or IA

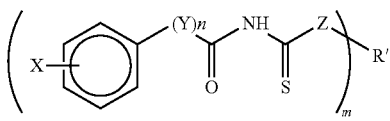

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth) acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

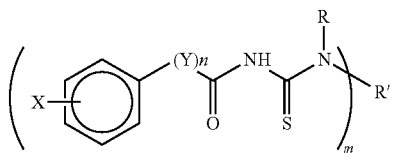

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring;
wherein X is optional, but when X is present, X is halogen, alkyl, alkenyl, cycloalkyl, hydroxyalkyl, hydroxyalkenyl, alkoxy, amino, alkylene- or alkenylene-ether, alkylene (meth) acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, to a desired substrate surface,
    applying an oxidant to that desired substrate surface,
    mating a second surface to that substrate surface to form an assembly, and
    exposing the assembly to appropriate conditions for a time sufficient to cure the composition.

5. A primer composition comprising a cure accelerator within structures I or IA

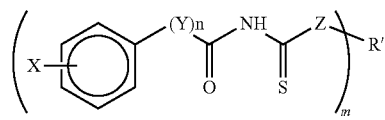

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —SO$_2$NH—, —CONH—, —NH—, and —PO(NHCONHCSNH$_2$)NH—; and n is 0 or 1 and m is 1 or 2, or

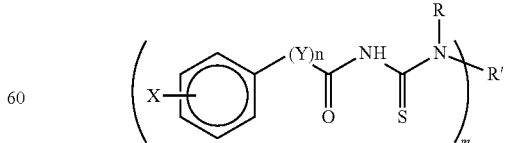

wherein R and R' are independently selected from hydrogen, alkyl, alkenyl, aryl, hydroxyalkyl, hydroxyalkenyl, alkylene (meth)acrylate, carbonyl, carboxyl, or sulfonato, or R and R' taken together form a carbocyclic or hetero atom-containing ring, or R' is a direct bond attaching to the phenyl ring; X is halogen, alkyl, alkenyl, cycloalkyl, hydroxyalkyl, hydroxyalkenyl, alkoxy, amino, alkylene- or alkenylene-ether, alkylene (meth)acrylate, carbonyl, carboxyl, nitroso, sulfonate, hydroxyl or haloalkyl; and Y is —$SO_2NH$—, —CONH—, —NH—, and —$PO(NHCONHCSNH_2)NH$—; and n is 0 or 1 and m is 1 or 2.

6. A reaction product prepared from the process of claim 1.
7. A reaction product prepared from the process of claim 2.
8. A reaction product prepared from the process of claim 3.
9. A reaction product prepared from the process of claim 4.
10. The process of claim 1, wherein the oxidant is selected from the group consisting of cumene hydroperoxide, paramenthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.
11. The process of claim 2, wherein the oxidant is selected from the group consisting of cumene hydroperoxide, paramenthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.
12. The process of claim 3, wherein the oxidant is selected from the group consisting of cumene hydroperoxide, paramenthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.
13. The process of claim 4, wherein the oxidant is selected from the group consisting of cumene hydroperoxide, paramenthane hydroperoxide, t-amyl hydroperoxide, 1,1,3,3-tetramethylbutyl hydroperoxide, t-butyl hydroperoxide, t-butyl perbenzoate, benzoyl peroxide, dibenzoyl peroxide, 1,3-bis(t-butylperoxyisopropyl)benzene, diacetyl peroxide, butyl 4,4-bis(t-butylperoxy)valerate, p-chlorobenzoyl peroxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane, and combinations thereof.
14. The process of claim 1, wherein the (meth)acrylate component is within the general structure $H_2C=CGCO_2R^1$, wherein G may be hydrogen or alkyl groups having from 1 to about 4 carbon atoms, and $R^1$ may be a member selected from the group consisting of alkyl, cycloalkyl, alkenyl, cycloalkenyl, alkaryl, aralkyl, and aryl groups having from 1 to about 16 carbon atoms, any of which may be optionally substituted or interrupted as the case may be with the group consisting of silane, silicon, oxygen, halogen, carbonyl, hydroxyl, ester, carboxylic acid, urea, urethane, carbonate, amine, amide, sulfur, sulfonate, and sulfone.
15. The process of claim 2, wherein the (meth)acrylate component is within the general structure $H_2C=CGCO_2R^1$, wherein G may be hydrogen or alkyl groups having from 1 to about 4 carbon atoms, and $R^1$ may be a member selected from the group consisting of alkyl, cycloalkyl, alkenyl, cycloalkenyl, alkaryl, aralkyl, and aryl groups having from 1 to about 16 carbon atoms, any of which may be optionally substituted or interrupted as the case may be with the group consisting of silane, silicon, oxygen, halogen, carbonyl, hydroxyl, ester, carboxylic acid, urea, urethane, carbonate, amine, amide, sulfur, sulfonate, and sulfone.
16. The process of claim 3, wherein the (meth)acrylate component is within the general structure $H_2C=CGCO_2R^1$, wherein G may be hydrogen or alkyl groups having from 1 to about 4 carbon atoms, and $R^1$ may be a member selected from the group consisting of alkyl, cycloalkyl, alkenyl, cycloalkenyl, alkaryl, aralkyl, and aryl groups having from 1 to about 16 carbon atoms, any of which may be optionally substituted or interrupted as the case may be with the group consisting of silane, silicon, oxygen, halogen, carbonyl, hydroxyl, ester, carboxylic acid, urea, urethane, carbonate, amine, amide, sulfur, sulfonate, and sulfone.
17. The process of claim 4, wherein the (meth)acrylate component is within the general structure $H_2C=CGCO_2R^1$, wherein G may be hydrogen or alkyl groups having from 1 to about 4 carbon atoms, and $R^1$ may be a member selected from the group consisting of alkyl, cycloalkyl, alkenyl, cycloalkenyl, alkaryl, aralkyl, and aryl groups having from 1 to about 16 carbon atoms, any of which may be optionally substituted or interrupted as the case may be with the group consisting of silane, silicon, oxygen, halogen, carbonyl, hydroxyl, ester, carboxylic acid, urea, urethane, carbonate, amine, amide, sulfur, sulfonate, and sulfone.

* * * * *